(12) United States Patent
Rock et al.

(10) Patent No.: US 7,081,316 B2
(45) Date of Patent: Jul. 25, 2006

(54) BIPOLAR PLATE ASSEMBLY HAVING TRANSVERSE LEGS

(75) Inventors: Jeffrey A Rock, Fairport, NY (US); Kim Griffith, Honeoye Falls, NY (US); Pinkhas A Rapaport, Fairport, NY (US)

(73) Assignee: General Motors Corporation, Detroit, MI (US)

(*) Notice: Subject to any disclaimer, the term of this patent is extended or adjusted under 35 U.S.C. 154(b) by 664 days.

(21) Appl. No.: 10/418,660

(22) Filed: Apr. 18, 2003

(65) Prior Publication Data

US 2003/0215692 A1    Nov. 20, 2003

Related U.S. Application Data

(60) Provisional application No. 60/377,297, filed on Apr. 30, 2002.

(51) Int. Cl.
*H01M 8/04* (2006.01)

(52) U.S. Cl. ............................................. 429/39; 429/38

(58) Field of Classification Search ............. 429/38–39
See application file for complete search history.

(56) References Cited

U.S. PATENT DOCUMENTS

| | | | |
|---|---|---|---|
| 5,514,487 A | 5/1996 | Washington et al. | |
| 5,527,363 A * | 6/1996 | Wilkinson et al. | 29/623.1 |
| 5,686,199 A | 11/1997 | Cavalca et al. | |
| 5,773,160 A * | 6/1998 | Wilkinson et al. | 429/13 |
| 5,981,098 A * | 11/1999 | Vitale | 429/34 |
| 6,007,933 A * | 12/1999 | Jones | 429/38 |
| 6,096,450 A * | 8/2000 | Walsh | 429/34 |
| 6,099,984 A | 8/2000 | Rock | |
| 6,309,773 B1 | 10/2001 | Rock | |
| 6,358,642 B1 | 3/2002 | Griffith et al. | |

OTHER PUBLICATIONS

Notification of Transmittal Of The International Search Report Or The Declaration, dated Jul. 30, 2003.

* cited by examiner

*Primary Examiner*—Mark Ruthkosky
(74) *Attorney, Agent, or Firm*—Harness, Dickey & Pierce, P.L.C.

(57) ABSTRACT

A bipolar plate assembly for use in a PEM fuel cell having an anode plate and a cathode plate together to define flow fields on the exposed faces thereof and a coolant volume therebetween. Each of the flow fields have a transverse inlet leg in fluid communication with the inlet header, a serpentine flow field extending from the transverse inlet leg and a transverse exhaust leg in fluid communication with the exhaust header. The plates further define a tortuous coolant flow path in the coolant volume.

35 Claims, 21 Drawing Sheets

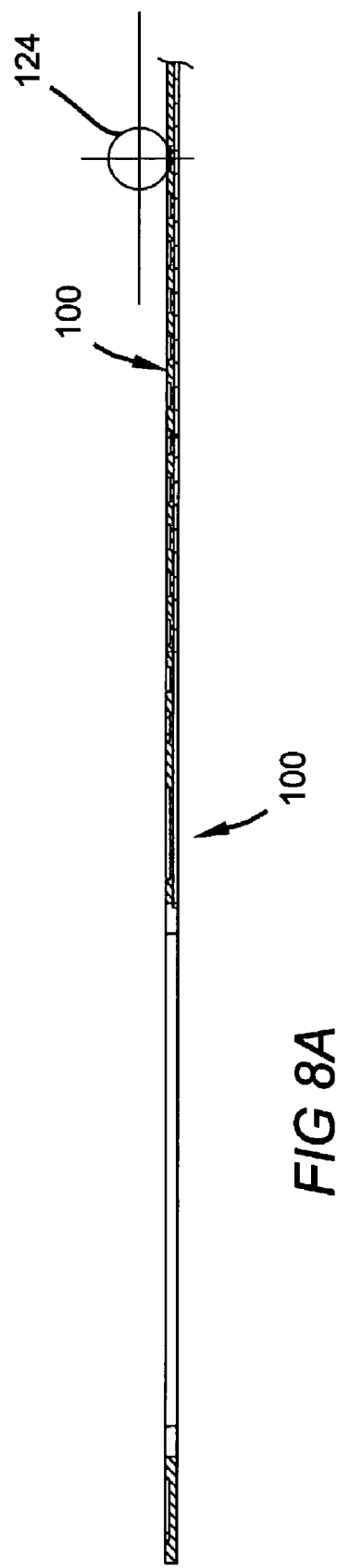
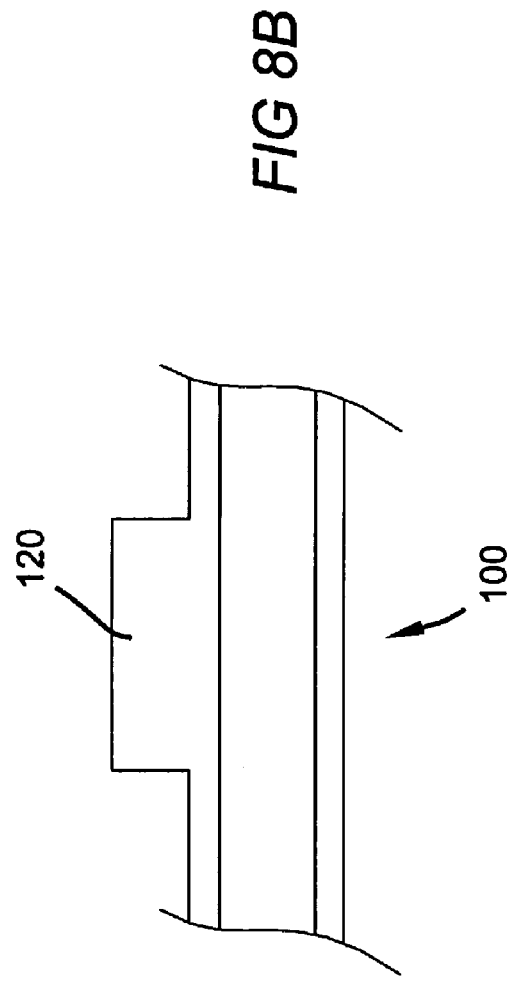

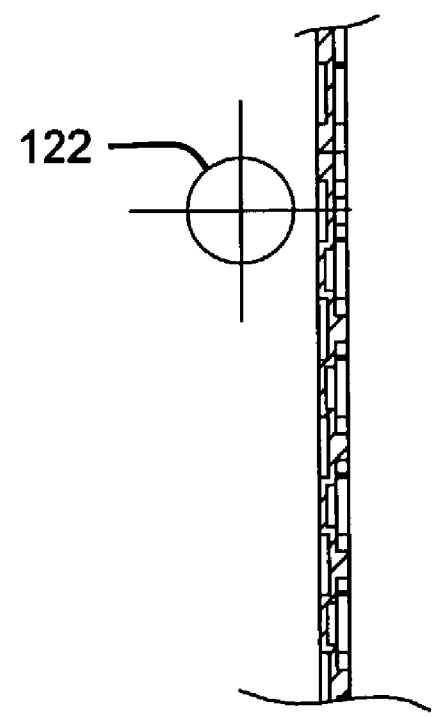
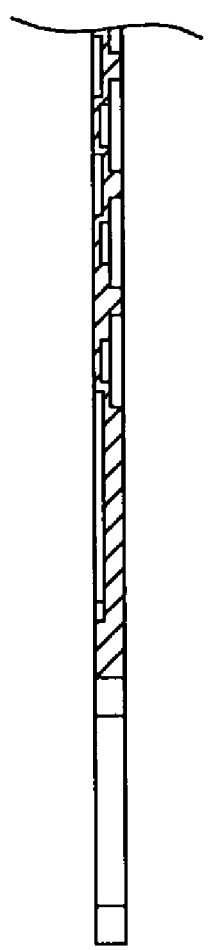
FIG 9

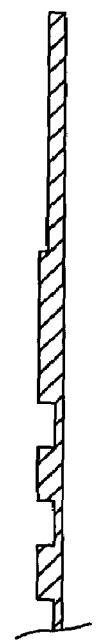
FIG 14
FIG 15

FIG 20
FIG 21
FIG 22

US 7,081,316 B2

BIPOLAR PLATE ASSEMBLY HAVING TRANSVERSE LEGS

CROSS-REFERENCE TO RELATED APPLICATION

This application claims the benefit of U.S. Provisional Application No. 60/377,297, filed on Apr. 30, 2002, the disclosure of which is incorporated herein by reference.

TECHNICAL FIELD

The present invention relates to a bipolar plate assembly for use in a fuel cell stack, and more particularly to a flow field geometry having transverse flow channels adjacent at the inlet and exhaust headers.

BACKGROUND OF THE INVENTION

Fuel cell systems have been proposed for use as a vehicular power plant to replace the internal combustion engine, as well as for use in portable and stationary distributed electrical power generation applications. Such systems typically include a proton exchange membrane (PEM-type) fuel cell in which hydrogen is supplied as the fuel to the anode and oxygen is supplied as the oxidant to the cathode of the fuel cell. PEM-type fuel cells include a membrane electrode assembly (MEA) comprising a thin, proton transmissive, non-electrically conductive solid polymer electrolyte membrane having the anode catalyst on one of its faces and the cathode catalyst on the opposite face. A plurality of individual cells are commonly arranged in series together to form a fuel cell stack.

The MEA is sandwiched between sheets of porous, gas-permeable, conductive material which press against the anode and cathode faces of the MEA and serve as (1) the primary current collectors for the anode and cathode, and (2) mechanical support for the MEA. The MEA and primary current collector are pressed between a pair of non-porous, electrically conductive metal sheets (i.e. bipolar plates) which serve as secondary current collectors for collecting the current from the primary current collectors and conducting current between adjacent cells internally of the stack. The bipolar plate contains a flow field that distributes the gaseous reactants over the surfaces of the anode and cathode. These flow fields generally include a plurality of lands which engage the primary current collector and define therebetween a plurality of flow channels through which the gaseous reactants flow between a supply manifold at one end of the channel and an exhaust manifold at the other end of the channel.

A bipolar plate assembly is formed by assembling a pair of metal sheets such that a functional flow field is formed on each side of the bipolar plate assembly. A spacer is interdisposed between the metal sheets to define an interior volume to permit coolant flow through the bipolar plate assembly. Examples of such bipolar plate assembly are described in U.S. Pat. No. 5,776,624 issued Jul. 7, 1998, and U.S. Pat. No. 6,099,984 and assigned to the assignee of the present invention.

SUMMARY OF THE INVENTION

The present invention is directed to a bipolar plate assembly for use in a PEM fuel cell having an anode plate and a cathode plate together to define flow fields on the exposed faces thereof and a coolant volume therebetween. Each of the flow fields have a transverse inlet leg in fluid communication with the inlet header, a serpentine flow field extending from the transverse inlet leg and a transverse exhaust leg in fluid communication with the exhaust header. The plates further define a tortuous coolant flow path in the coolant volume.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8A is a cross-sectional view taken through the anode plate at line E of FIG. 7;

FIG. 8B is a detailed view of the anode plate as indicated at detail F of FIG. 7;

FIG. 9 is a cross-sectional view taken through the anode plate at line G of FIG. 7;

FIG. 14 is a cross-sectional view taken through the anode plate at line K of FIG. 13;

FIG. 15 is a cross-sectional view taken through the anode plate at line L of FIG. 13;

FIG. 20 is a cross-sectional view taken through the anode plate at line O of FIG. 19;

FIG. 21 is a cross-sectional view taken through the anode plate at line P of FIG. 19;

FIG. 22 is a cross-sectional view taken through the anode plate at line Q of FIG. 19;

DESCRIPTION OF THE PREFERRED EMBODIMENT

The following description of the preferred embodiment is merely exemplary in nature and is in no way intended to limit the invention, its application, or uses.

Figure 1:
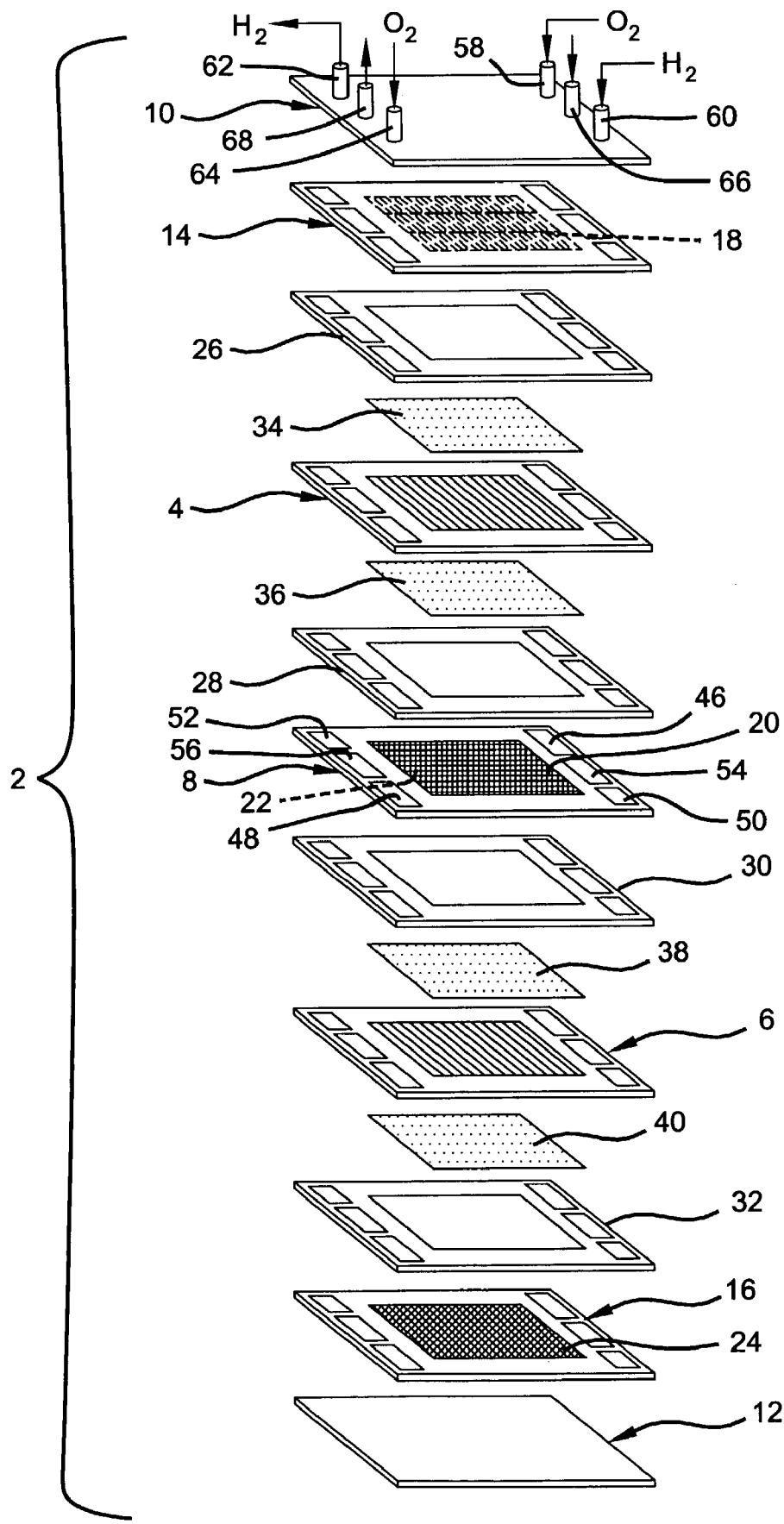
FIG. 1 is a schematic, exploded, isometric illustration of two cells of a liquid-cooled PEM fuel cell stack.

With reference to FIG. 1, a two-cell stack (i.e., one bipolar plate) is illustrated and described hereafter, it being understood that a typical stack will have many more such cells and bipolar plates. FIG. 1 depicts a two-cell PEM fuel cell stack 2 having a pair of membrane-electrode-assemblies (MEAS) 4, 6 separated from each other by an electrically conductive, liquid-cooled bipolar plate 8. The MEAs 4, 6, and bipolar plate 8 are stacked together between clamping plates 10, 12 and monopolar end plates 14, 16. The clamping plates 10, 12 are electrically insulated from the ends plate 14, 16. The monopolar end plates 14, 16 as well as both working faces of the bipolar plate 8, contain a plurality of grooves or channels 18, 20, 22, 24 defining a so-called "flow field" for distributing fuel and oxidant gases (i.e., $H_2$ and $O_2$) over the faces of the MEAs 4,6. Nonconductive gaskets 26, 28, 30 and 32 provide seals and electrical insulation between the several components of the fuel cell stack. Gas-permeable diffusion media 34, 36, 38, 40 press up against the electrode faces of the MEAs 4, 6. The end plates 14 and 16 press up against the diffusion media 34, 40 respectfully, while the bipolar plate 8 presses up against the diffusion media 36 on the anode face of MEA 4, and against diffusion media 38 on the cathode face of MEA 6. The bipolar plate assembly 8 includes two separate metal blanks which are formed with the flow fields (i.e., an anode plate 100 and a cathode plate 200) and bonded together so as to define a coolant volume therebetween. The metal sheets are made as thin as possible (e.g., about 0.002-0.02 inches thick). Forming may, for example, be accomplished by photo-etching (i.e., through a photolithographic mask), by other similar chemical milling processes or by suitable mechanical machining or stamping techniques as is know in the art. Bonding may, for example, be accomplished by brazing, welding, diffusion bonding or gluing with a conductive adhesive as is well known in the art.

The anode plate 100 and cathode plate 200 of bipolar plate assembly 8 are shown having a central active region that confronts the MEAs 36, 38 and is bounded by inactive regions or margins. The anode plate 100 has a first working face having an anode flow field 102 including a plurality of serpentine flow channels for distributing hydrogen over the anode face of the MEA that it confronts. Likewise, the cathode plate 200 has a second working face having a cathode flow field 202 including a plurality of serpentine flow channels for distributing oxygen (often in the form of air) over the cathode face of the MEA that it confronts. The active region of the bipolar plate 8 is flanked by two inactive border portions or margins which contain openings 46–56 formed therethrough. When the anode and cathode plates 100, 200 are stacked together, the openings in one bipolar plate assembly are aligned with like opening in adjacent bipolar plate assemblies. Other components of the fuel cell stack 2 such as gaskets 26–32 as well as the membrane of the MEAs 4, 6 and the monopolar plates 14, 16 have corresponding openings that align with the openings in the bipolar plate assembly in the stack, and together form headers for supplying and removing gaseous reactants and liquid coolant to/from the stack.

In the embodiment shown in the figures opening 46 in a series of stacked plates forms an air inlet header, opening 48 in series of stacked plates forms an air outlet header, opening 50 in a series of stacked plates forms a hydrogen inlet header, openings 52 in a series of stacked plates forms a hydrogen outlet header, opening 54 in a series of stacked plates forms a coolant inlet header, and opening 56 in a series of stacked plates forms a coolant outlet header. Inlet plumbing 58, 60 for both the oxygen/air and hydrogen are in fluid communication with the inlet headers 46, 50 respectively. Likewise, exhaust plumbing 62, 64 for both the hydrogen and the oxygen/air are in fluid communication with the exhaust headers 48, 52 respectively. Additional plumbing 66, 68 is provided for respectively supplying liquid coolant to and removing coolant from the coolant inlet header 54 and coolant outlet header 56.

With specific reference to FIGS. 2–6, an anode plate 100 is illustrated having an anode flow field 102 formed in the face thereof. A seal groove 104 extends around the perimeter of the anode plate 100 and between the flow field 102 and the headers 46–56 formed in the bipolar plate. The flow field 102 consists of a series of flow channels 106 having an inlet leg portion 108, a serpentine portion 110 and an exhaust leg portion 112. As illustrated in the presently preferred embodiment, anode flow field 102 includes twenty-four flow channels. The geometry of each flow channel 106 is such that the overall length of each flow channel is substantially equal.

Figure 2:
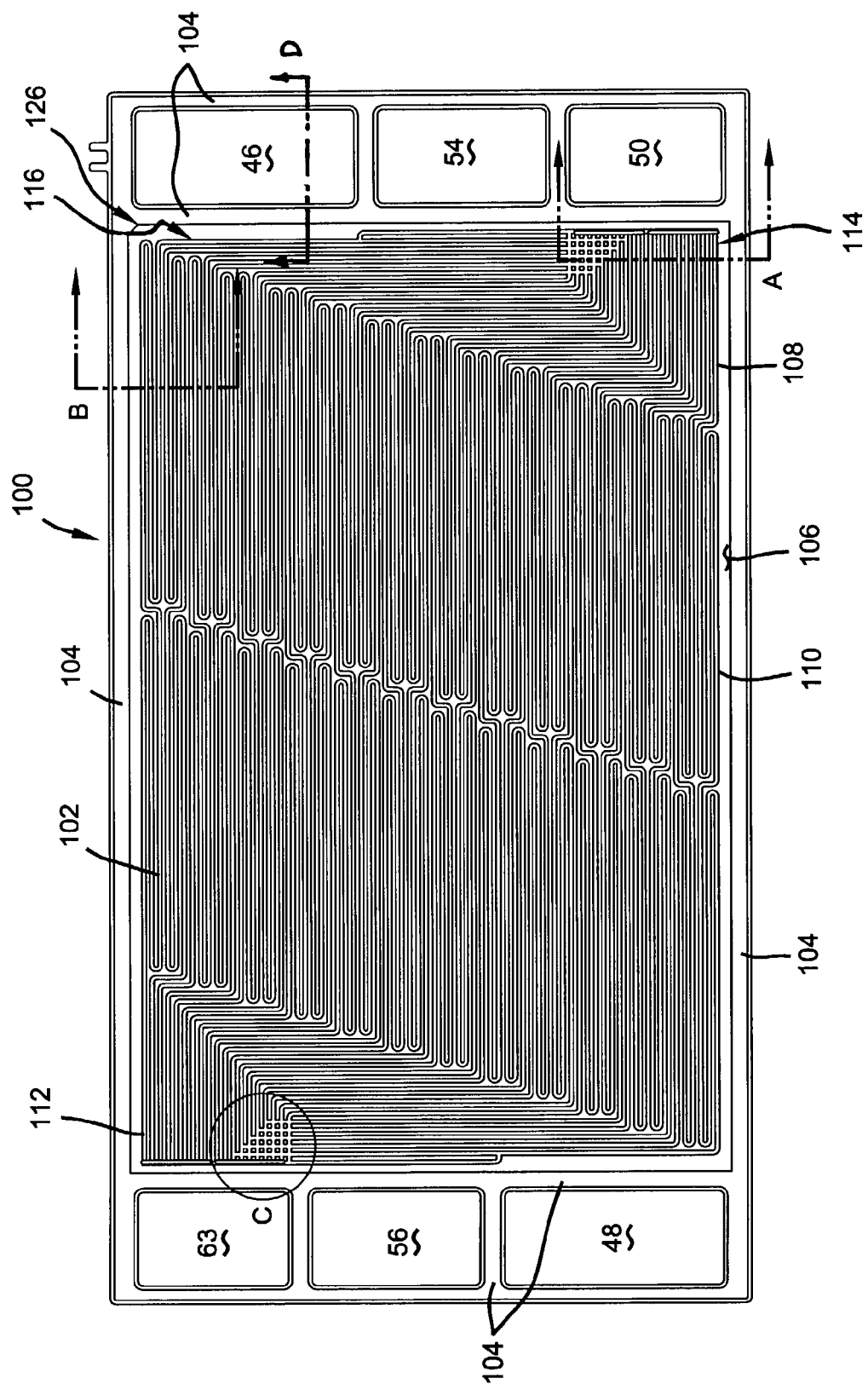
FIG. 2 is a plan view of the reactant side of the anode plate.
Figure 3:
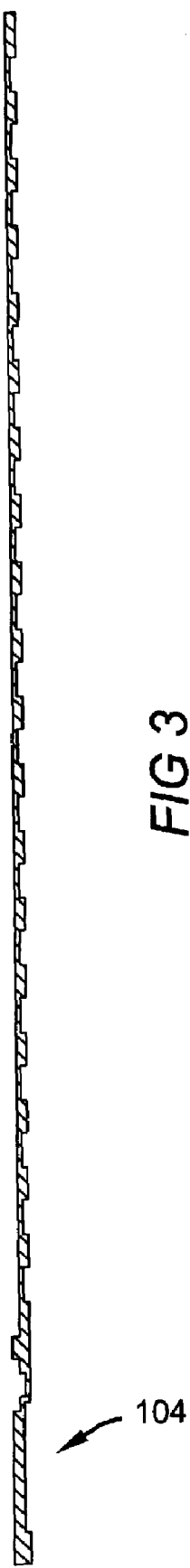
FIG. 3 is a cross-sectional view taken through the anode plate at line A of FIG. 2.

The inlet leg 108 for each flow channel is configured slightly differently to enable flow to be directed from the anode inlet header 50 located along the lower lateral edge of the anode plate 100 through the inlet leg portion 108 to the serpentine leg portion 110. For example, the lower most channel 114 (as shown in FIG. 2) includes an inlet leg portion 108 having a relatively long longitudinal section and a relatively short transverse section leading to the serpentine flow portion 110. In contrast, the upper most flow channel 116 (as shown in FIG. 2) includes a relatively long transverse section extending directly to the serpentine portion 110. The serpentine flow channel 110 includes a pair of serpentine channels serially arranged along the flow path. The length of the serpentine portions 110 for each flow channel are equal.

The exhaust leg portion 112 of the flow channel 106 is an inverse of the corresponding inlet leg portion 108 for a given flow channel to enable flow to be directed from the exhaust leg portion 112 to the anode exhaust header 52 located along the upper lateral edge of the anode plate 100. For example, the exhaust leg portion 112 of flow channel 114 includes a transverse leg portion extending from the anode exhaust header to the serpentine flow channel 110 in a manner similar to that heretofore described with respect to the inlet leg portion for flow channel 116. Conversely, the exhaust leg portion 112 of flow channel 116 includes a relatively short transverse leg portion extending from the serpentine portion to a relatively long longitudinal portion extending from the transverse portion to the anode exhaust gas header in a manner similar to that heretofore describe with respect to the inlet leg portion 108 of flow channel 114. In this manner, the sum of the length of the transverse inlet leg and the transverse exhaust leg are equal for each flow channel. Likewise, the sum of the length of the longitudinal inlet leg and the longitudinal exhaust leg are equal for each flow channel. This configuration serves the function of providing a flow field geometry in which each of the flow channels have substantially the same length while at the same time distributing the reactant gases from a single common inlet header 50 to a single common exhaust header 52.

Figure 5:
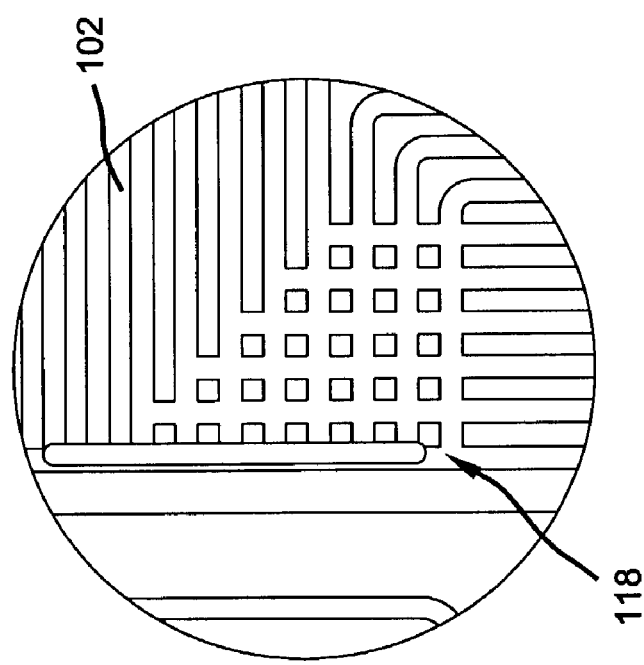
FIG. 5 is a detail view of the anode plate as indicated at detail C of FIG. 2.
Figure 6:
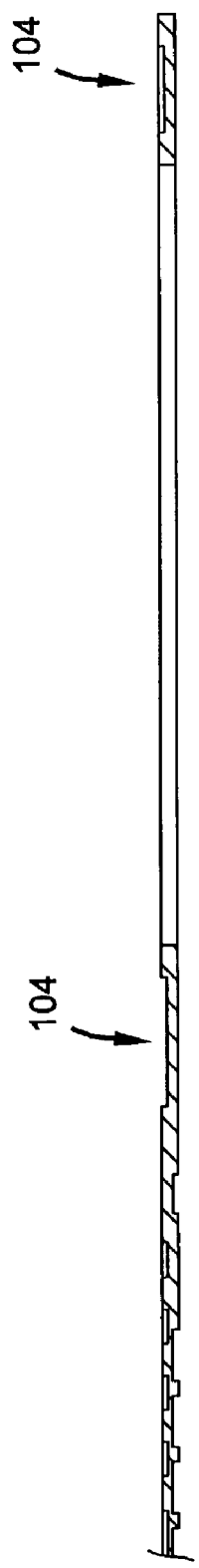
FIG. 6 is a cross-sectional view taken through the anode plate at line D of FIG. 2.

With reference to FIG. 5, the anode flow field 102 further includes an array of flow disruptors 118 for the inner most exhaust legs 112. These flow disruptors 118 facilitate distribution of reactant gases in a tight transition area which would otherwise create a substantial pressure drop. As such, the flow restrictions are locally reduced to control the pressure drop in the medial exhaust legs 112. A similar array of flow disruptors are formed for the inner most inlet legs 108 as illustrated in FIG. 2.

Figure 7:
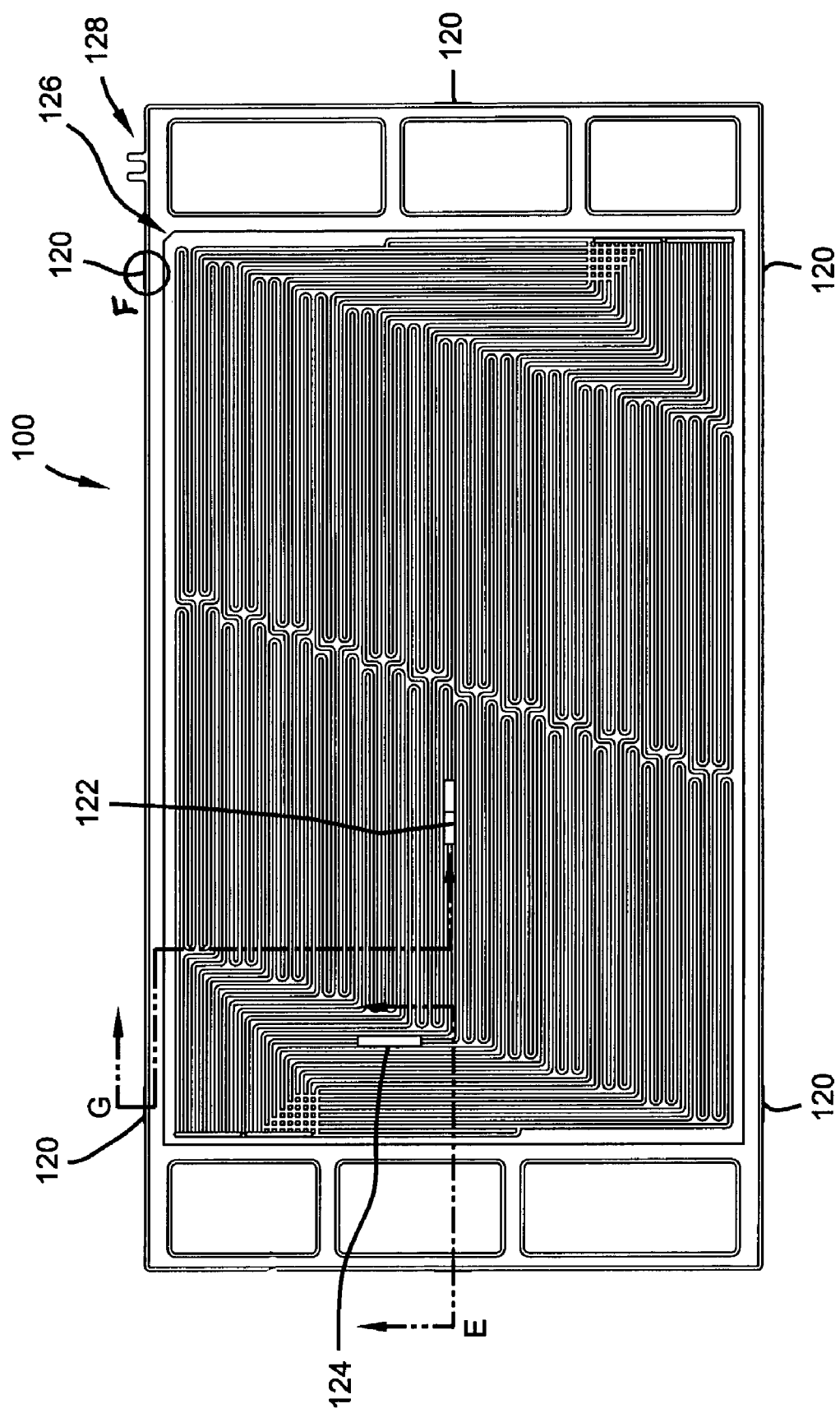
FIG. 7 is a plan view of the reactant flow field of the anode plate similar to that shown in FIG. 2 and further illustrating alignment locations for machining.

With reference now to FIGS. 7–9, the anode plate 100 further includes certain alignment features to facilitate fabrication of the fuel cell stack 2. Specifically, machining allowance tabs 120 are formed around the perimeter of the anode plate. The machining allowance tabs 120 are formed in the anode plate 100 and appropriately position the anode plate 100 during machining of the anode flow field 102. Once the anode flow field 102 has been formed in the plate 100, datum pins 122, 124 (as seen in FIGS. 7–9) are provided on a fixture (not shown) to appropriately position the anode plate 100 for final machining. Specifically, datum pin 122 locates within a serpentine portion 110 of a reference flow channel 126 and datum pin 124 locates within the transverse leg of an exhaust leg portion 112 of the reference flow channel. Thus, precise control and enhanced repeatability is achieved for the fabrication of the anode plate 100. The anode plate 100 also includes certain features to insure proper orientation and alignment of the MEAs. Specifically, a chamfered corner 126 is formed adjacent the anode flow field 102 to provide an asymmetric feature for orienting the MEA. Likewise, the terminal 128 extending from the perimeter of the anode plate 100 serves as an orientation feature.

Figure 4:
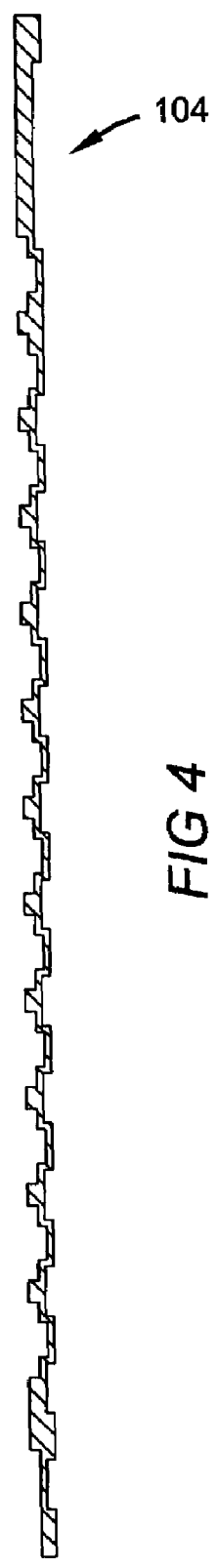
FIG. 4 is a cross-sectional view taken through the anode plate at line B of FIG. 2.
Figure 10:
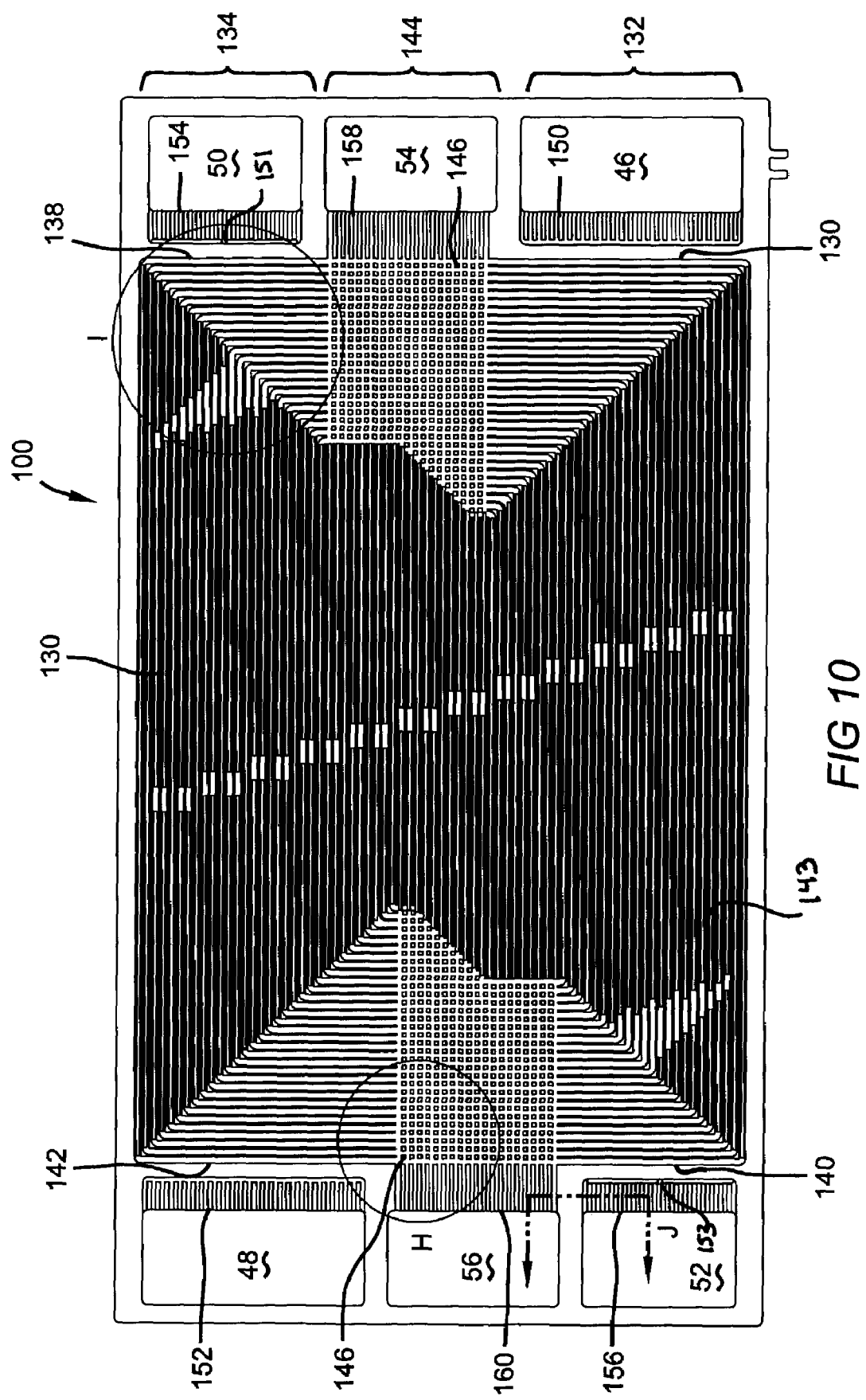
FIG. 10 is a plan view of the coolant side of the anode plate shown in FIG. 2.
Figure 11A:
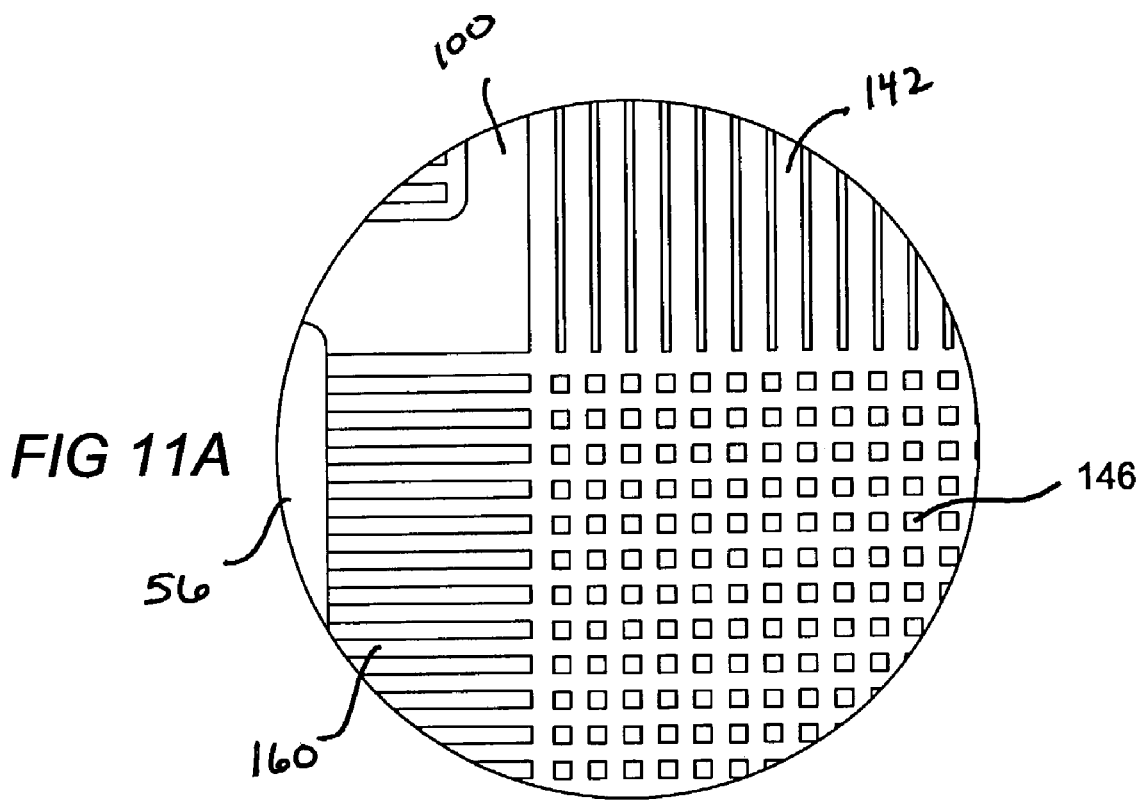
FIG. 11A is a detail view of the anode plate as indicated at detail H of FIG. 10.
Figure 11B:
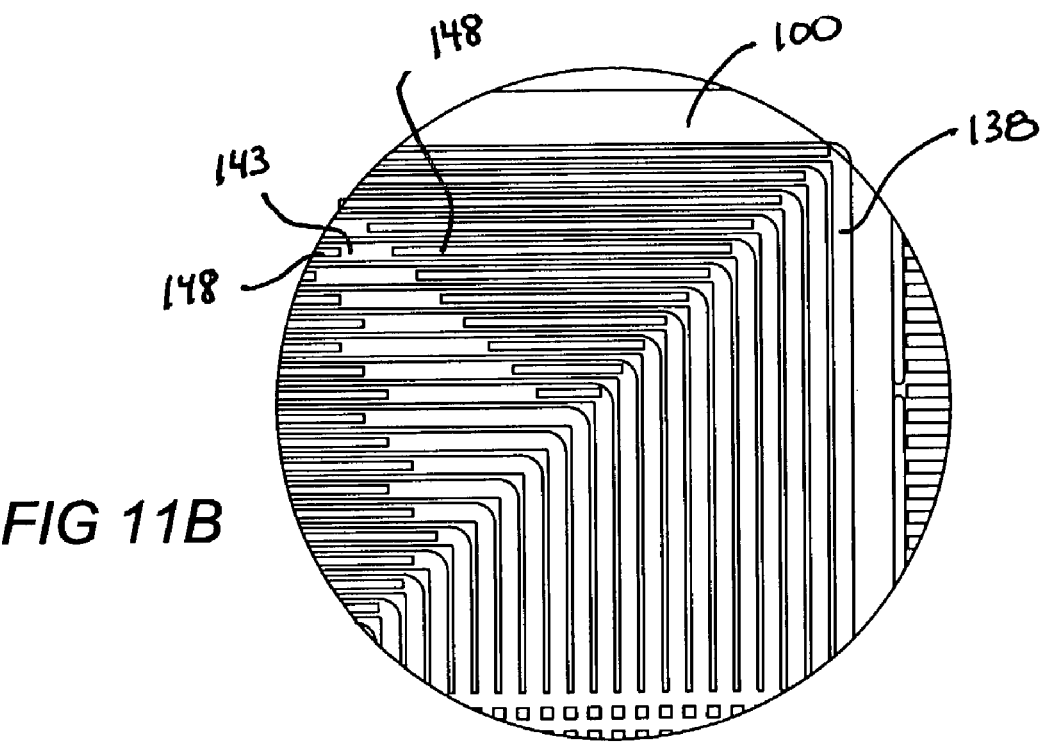
FIG. 11B is a detail view of the anode plate as indicated at detail I of FIG. 10.
Figure 12:
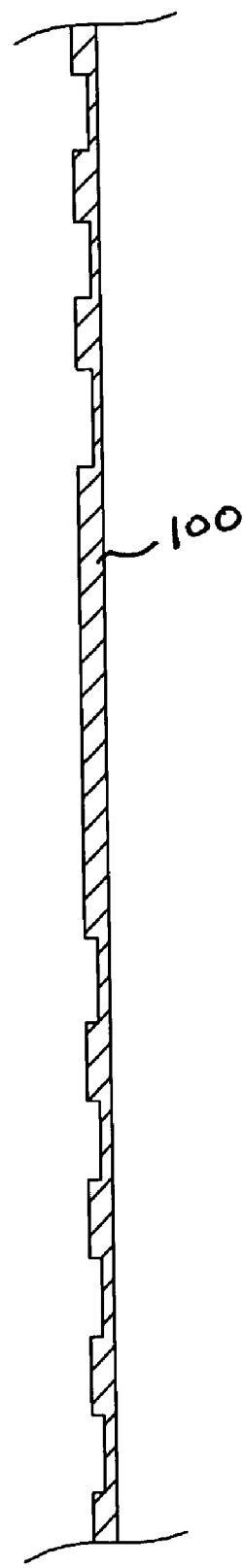
FIG. 12 is a cross-sectional view taken through the anode plate at line J of FIG. 10.
Figure 13:
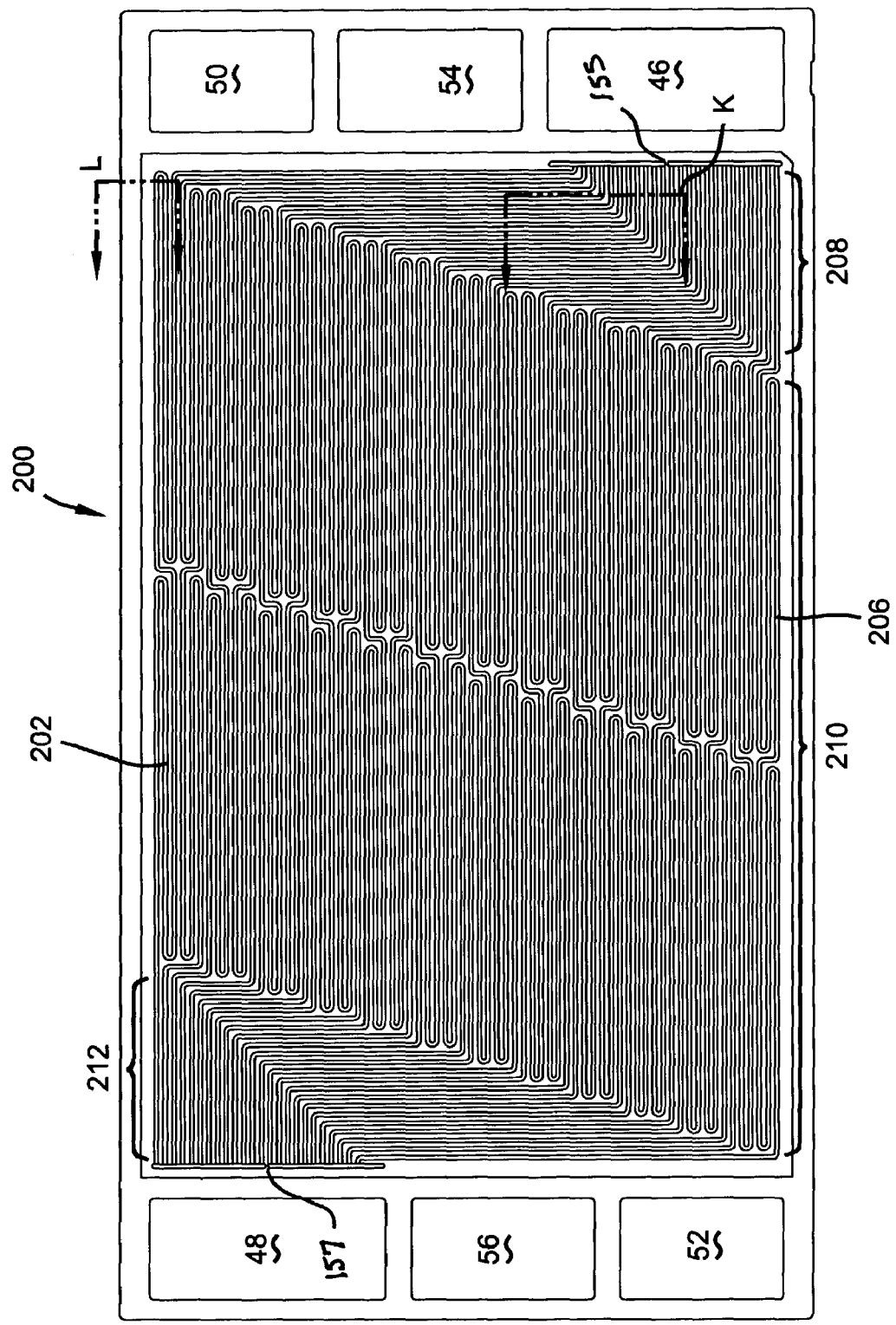
FIG. 13 is a plan view of the reactant side of the cathode plate.
Figure 16:
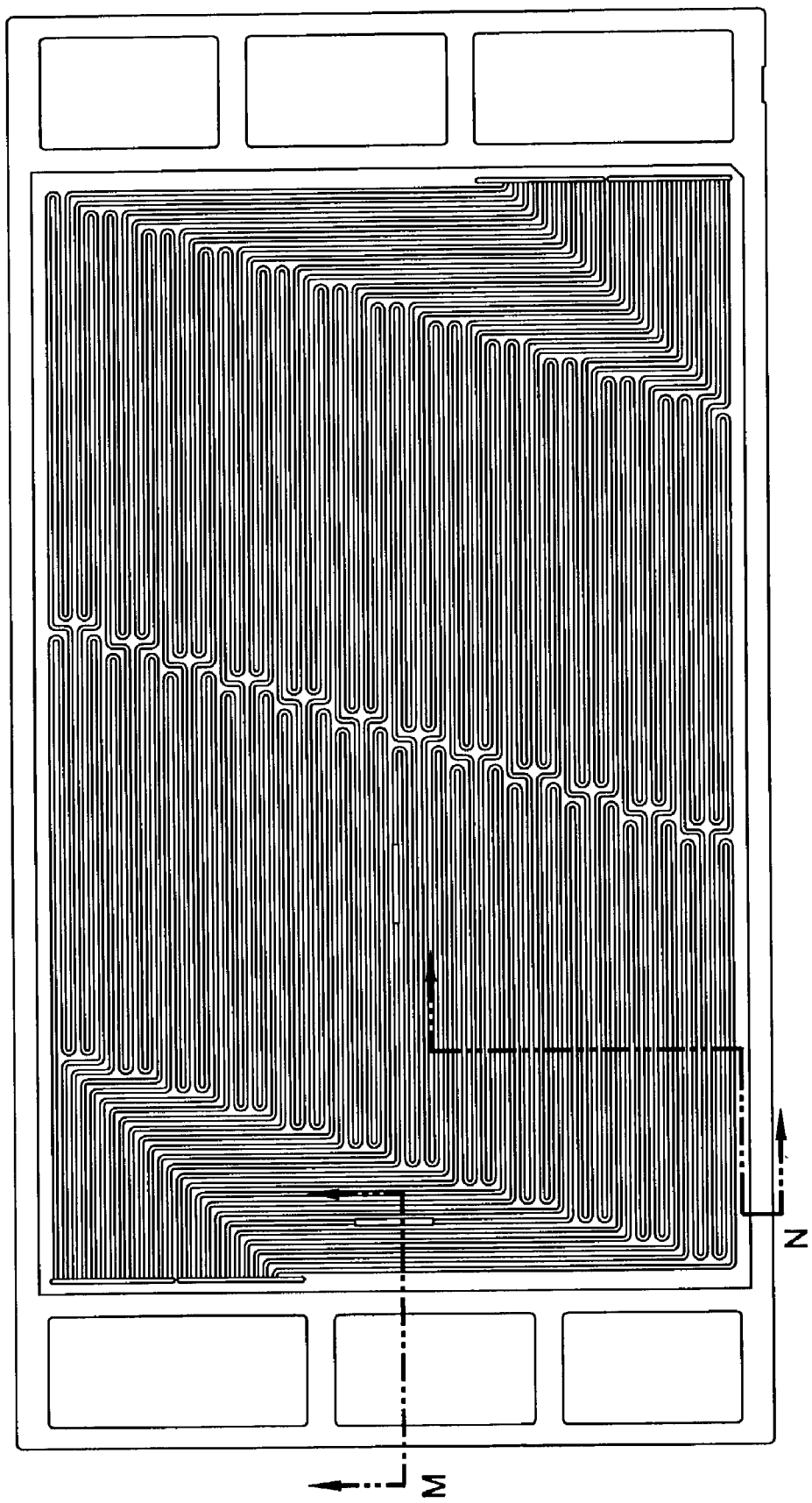
FIG. 16 is a plan view of the reactant flow field of the anode plate similar to that shown in FIG. 13 and further illustrating alignment locations for machining.
Figure 17:
FIG. 17 is a cross-sectional view taken through the anode plate at line M of FIG. 16.
Figure 18:
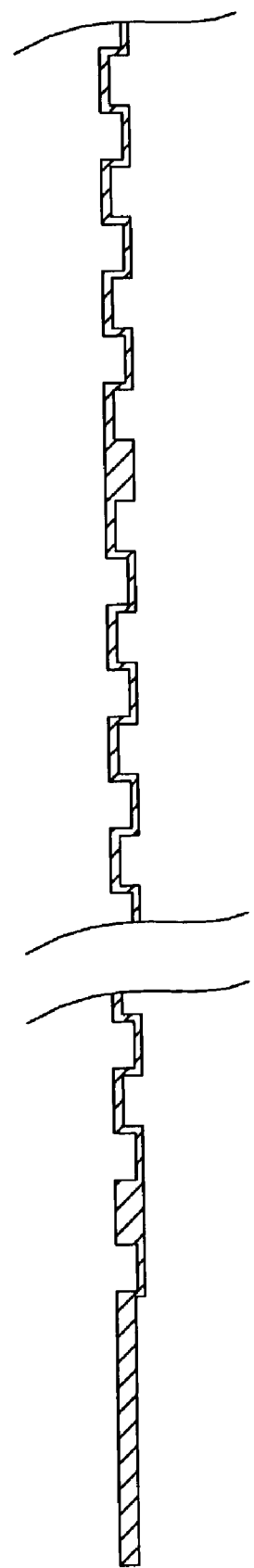
FIG. 18 is a cross-sectional view taken through the anode plate at line N of FIG. 16.
Figure 19:
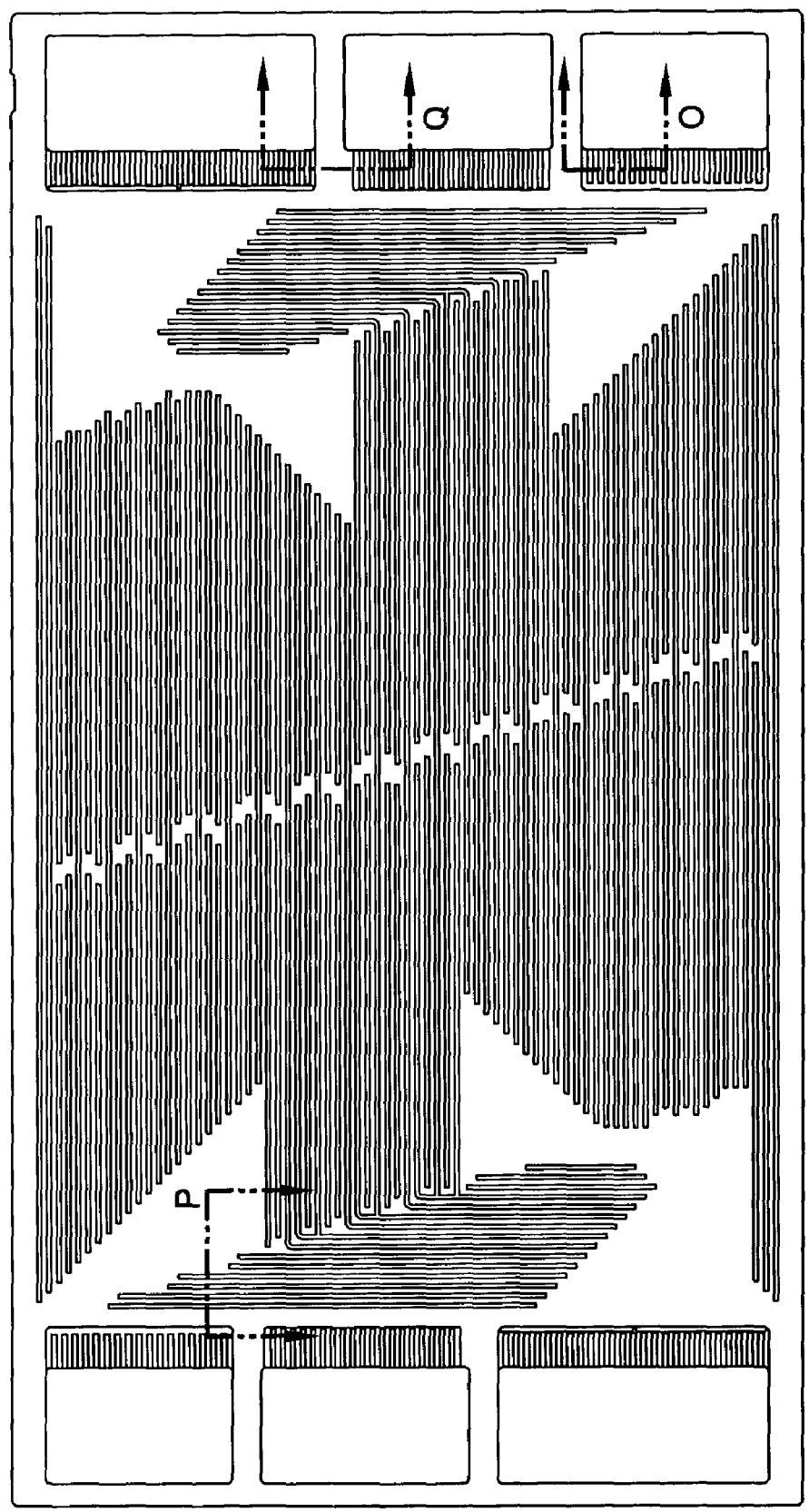
FIG. 19 is a plan view of the coolant side of the anode plate shown in FIG. 13.
Figure 23:
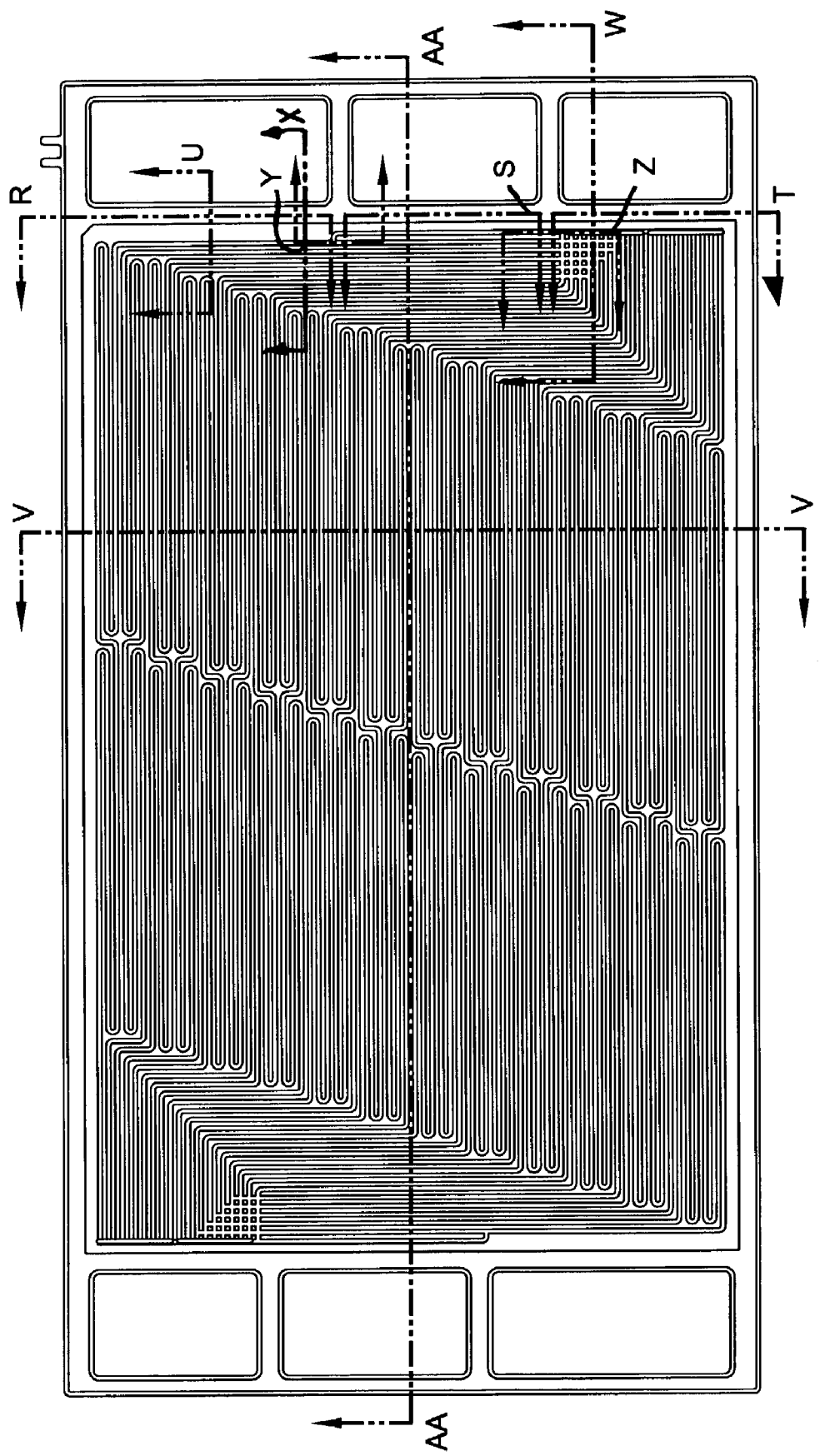
FIG. 23 is a plan view of the anode side of the assembled bipolar plate assembly.

With reference now to FIGS. 10–12 the coolant side of anode plate 100 is illustrated. As can be seen in FIG. 10, a coolant flow field 130 is formed on the face of the anode plate 100 opposite the anode gas flow field 102. The coolant channels for the lateral portions 132, 134 of the coolant flow field 130 include transverse inlet legs 136, 138 respectively and transverse exhaust leg portions 140, 142 respectively. Longitudinal flow channels 143 extend generally the length of the coolant flow field 130 and are in fluid communication with the inlet legs 136, 138 and the exhaust legs 140, 142. As shown in FIG. 11A, the medial portion 144 includes discrete flow disruptors 146 adjacent the inlet header 54 and exhaust header 56. The coolant flow field 130 further includes certain plate lightening features for reducing the overall mass of the anode plate 100. Specifically, plate material is removed from the coolant side of the anode plate 100 where excess thickness exists. As can be seen in FIGS. 4, 10 and 11B, plate material is removed from the coolant side of the anode plate 100 opposite the reactant side thereof. As best seen in FIG. 10, such weight reducing or lightening features are formed primarily in the longitudinally extending legs 143 of the coolant flow field 130. Specifically, each of the longitudinal flow channels 143 has a groove 148 formed therein to locally increase the depth of the channel, thereby locally thinning the anode plate 100 and reducing its overall mass.

With continued reference to FIG. 10, an anode gas inlet manifold 150 formed in the coolant side of the anode plate 100 provides fluid communication from the anode gas inlet header 46 to the anode gas flow field 102 through an anode inlet port 151 in anode plate 100. Similarly, anode exhaust manifold 152 formed in the coolant side of anode plate 100 adjacent the anode gas exhaust manifold 48 provides fluid communication from the anode gas flow field 102 through an anode exhaust port 153 in anode plate 100 to the anode gas exhaust header 48. In a similar manner, cathode gas inlet manifold 154 formed in the coolant side of anode plate 100 provides fluid communication from cathode gas inlet header 46 through a cathode inlet port formed in the cathode plate 200. Cathode gas exhaust manifold 156 provides fluid communication from the cathode flow field 202 to cathode exhaust header 48 through a cathode exhaust port formed in the cathode plate 200. Likewise, coolant inlet manifold 158 and coolant exhaust manifold 160 are formed adjacent to coolant inlet header 54 and coolant exhaust header 56 and provide fluid communication between the headers 54, 56 and the coolant volume 300.

With reference now to FIGS. 13–22, a cathode plate 200 is illustrated. Cathode plate 200 includes a cathode flow field 202 formed therein. As illustrated, cathode flow field 202 includes twenty-four flow channels formed therein. Each flow channel includes an inlet leg portion 208, a serpentine portion 210 and an exhaust leg portion 212. The inlet leg portion 208 is in fluid communication with the cathode manifold 154 via cathode inlet port 155. The exhaust leg portion 212 is in fluid communication with the cathode exhaust manifold 156 via the cathode exhaust port 157. The cathode flow field 202, while not identical to the anode flow field 102, is similar in design with variation therebetween being understood from a comparison of FIG. 2 and FIG. 13 and the description provided above with respect to anode flow field 102.

Figure 24:
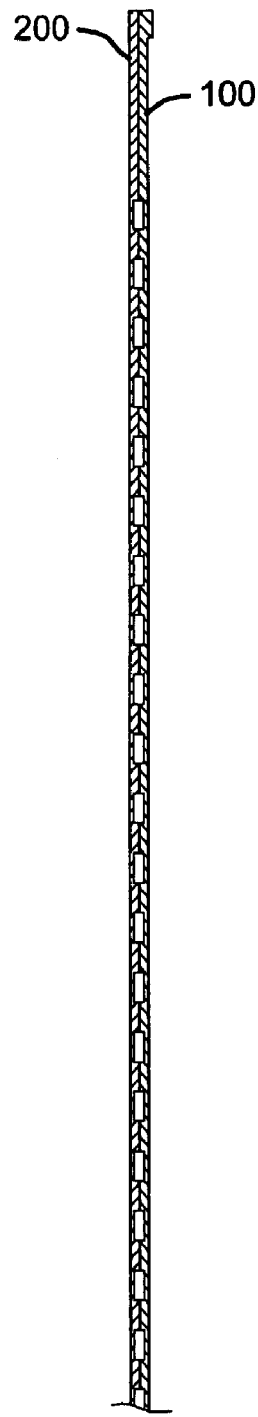
FIG. 24 is a cross-sectional view taken through the bipolar plate assembly at line R of FIG. 23.
Figure 25:
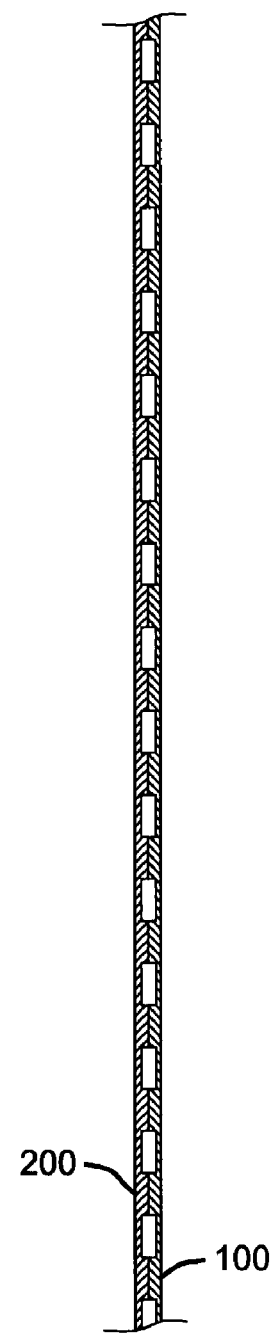
FIG. 25 is a cross-sectional view taken through the bipolar plate assembly at line S of FIG. 23.
Figure 26:
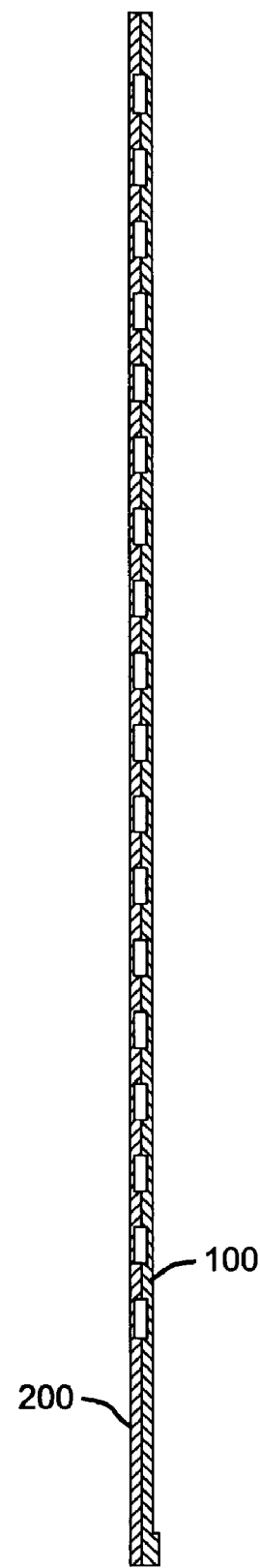
FIG. 26 is a cross-sectional view taken through the bipolar plate assembly at line T of FIG. 23.
Figure 27:
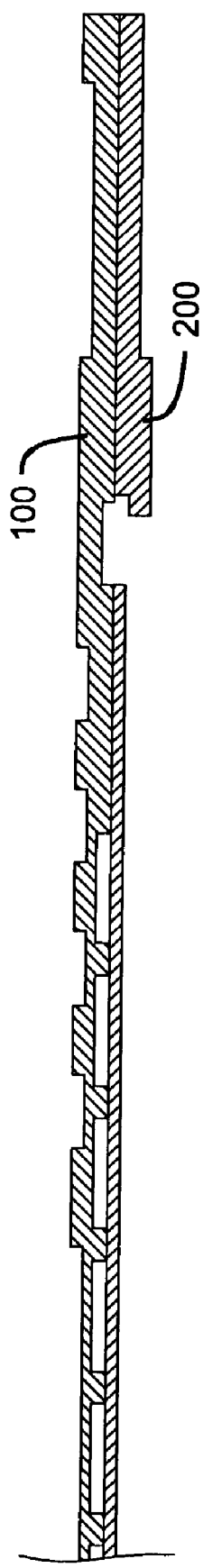
FIG. 27 is a cross-sectional view taken through the bipolar plate assembly at line U of FIG. 23.
Figure 28:
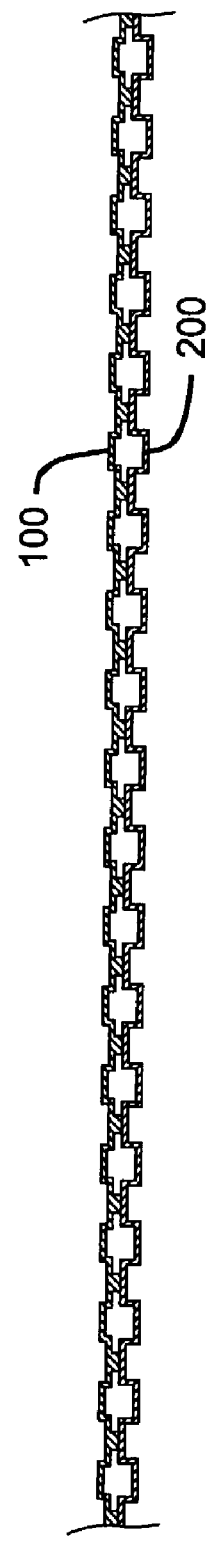
FIG. 28 is a cross-sectional view taken through the bipolar plate assembly at line V of FIG. 23.
Figure 29:
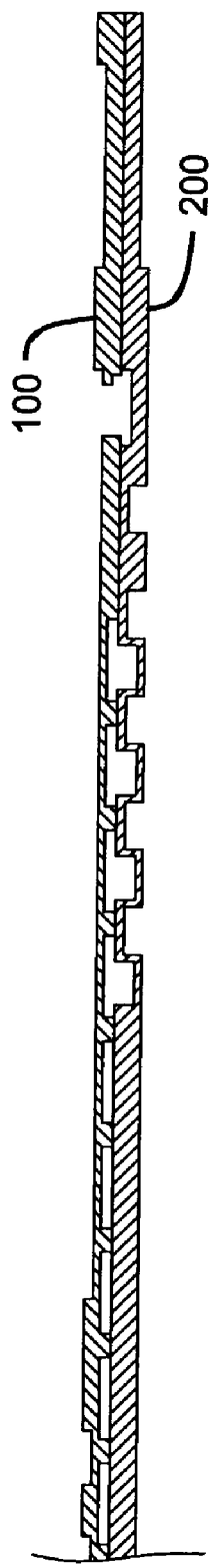
FIG. 29 Is a cross-sectional view taken through the bipolar plate assembly at line W of FIG. 23.
Figure 30:
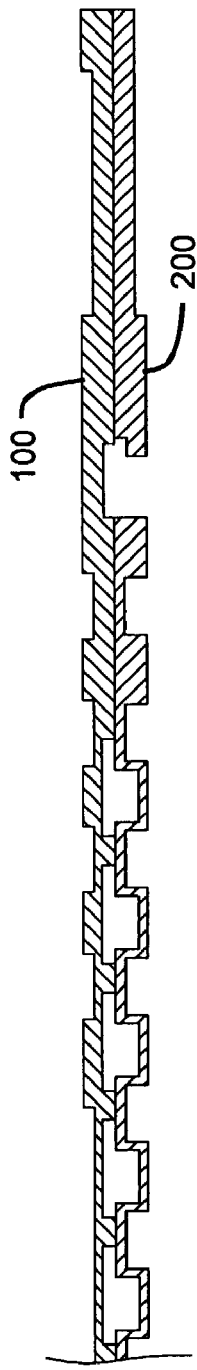
FIG. 30 is a cross-sectional view taken through the bipolar plate assembly at line X of FIG. 23.
Figure 31:
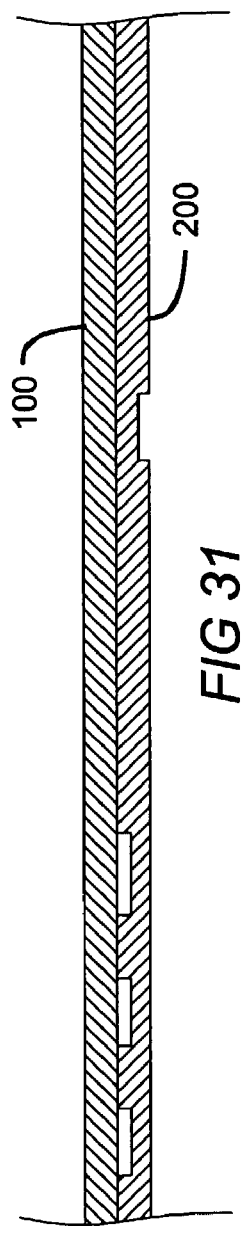
FIG. 31 is a cross-sectional view taken through the bipolar plate assembly at line Y of FIG. 23.
Figure 32:
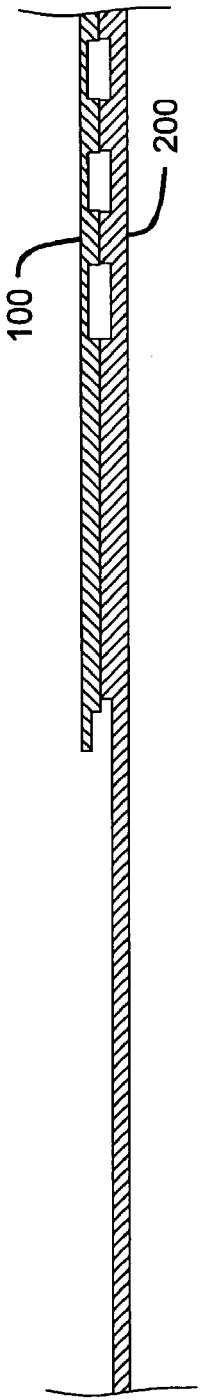
FIG. 32 is a cross-sectional view taken through the bipolar plate assembly at line Z of FIG. 23.
Figure 33:
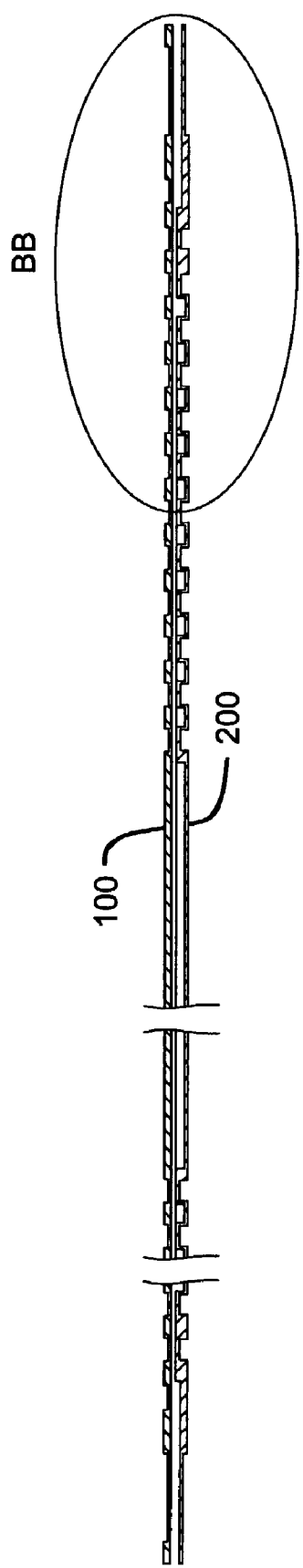
FIG. 33 is a cross-sectional view taken through the bipolar plate assembly at line AA of FIG. 23.
Figure 34:
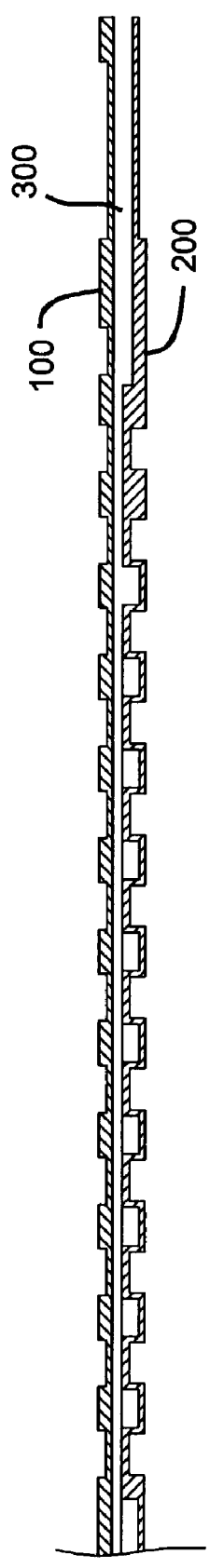
FIG. 34 is a detail view of the bipolar plate assembly as indicated at Detail BB of FIG. 33.

With reference now to FIGS. 23–34, the bipolar plate assembly 8 is illustrated. Bipolar plate assembly 8 includes anode plate 100 and cathode plate 200 arranged such that the coolant flow fields 130, 230 are positioned in an adjacent facing relationship to form a coolant volume 300 therebetween. With particular reference to FIGS. 24–26, the inlet and exhaust manifold formed in the coolant side of the anode and cathode plates 100, 200 align to form inlet manifolds to direct reactant gases from the respective header to the respective flow field 102, 202 and coolant from the coolant header to the coolant flow fields 130, 230.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A flow field plate for use in a fuel cell of the type having a thin plate including an inlet margin having an inlet header formed therethrough, an exhaust margin having an exhaust header formed therethrough, and a first major face having a flow field formed therein, said flow field defined by a plurality of flow channels, each of said plurality of flow channels comprising:
   an inlet leg including a first longitudinal portion in fluid communication with said inlet header and a first transverse portion;
   a serpentine leg having a first end in fluid communication with said first transverse portion and a second end; and
   an exhaust leg having a second transverse portion in fluid communication with said second end of said serpentine leg and a second longitudinal portion in fluid communication with said first exhaust header;
   wherein said inlet legs of each of said plurality of flow channels are of equal length, said serpentine legs of each of said plurality of flow channels are of equal length, and said exhaust legs of each of said plurality of flow channels are of equal length.

2. The flow field plate of claim 1 wherein each of said serpentine legs comprise a first serpentine channel having an inlet in fluid communication with said first transverse portion of said inlet leg and a second serpentine channel having an inlet in fluid communication with an exhaust of said first serpentine channel and an exhaust in fluid communication with said second transverse portion of said exhaust leg.

3. The flow field plate of claim 2 wherein said first and second serpentine channels of each of said serpentine legs are of equal length.

4. The flow field plate of claim 1 wherein a sum of the length of said first transverse portion and the length of said second transverse portion for each of said flow channels is equal.

5. The flow field plate of claim 4 wherein a sum of the length of said first longitudinal portion and the length of said second longitudinal portion for each of said flow channels is equal.

6. The flow field plate of claim 1 further comprising a plurality of inlet manifolds formed in a second major face opposite said first major face and an inlet port formed through said inlet margin to provide fluid communication from said inlet header to said flow field.

7. The flow field plate of claim 6 further comprising a plurality of exhaust manifolds formed in said second major face and an exhaust port formed through said exhaust margin to provide fluid communication from said flow field to said exhaust header.

8. The flow field plate of claim 1 wherein said flow field further comprise a transition zone interposed between said inlet header and at least a portion of said inlet legs, said transition zone having an array of flow disruptors.

9. The flow field plate of claim 1 wherein said flow field further comprise a transition zone interposed between said at least a portion of said exhaust legs and said exhaust header, said transition zone having an array of flow disruptors.

10. The flow field plate of claim 1 further comprising a second flow field formed in a second major face opposite said first major face of said thin plate, said second flow field having a plurality of longitudinal flow channels formed therein, a plurality of transverse inlet legs providing fluid communication from a second inlet header formed in said inlet margin and said plurality of longitudinal flow channels, and a plurality of transverse exhaust legs providing fluid communication from said plurality of longitudinal flow channels to a second exhaust header formed in said exhaust margin.

11. The flow field plate of claim 10 further comprising a plurality of inlet manifolds formed in said second major face to provide fluid communication from said second inlet header to said second flow field.

12. The flow field plate of claim 10 further comprising a plurality of exhaust manifolds formed in said second major face to provide fluid communication from said second flow field to said second exhaust header.

13. The flow field plate of claim 10 wherein said second flow field further comprises an array of discrete flow disruptors adjacent said second inlet header.

14. The flow field plate of claim 10 wherein said second flow field further comprises an array of discrete flow disruptors adjacent said second exhaust header.

15. The flow field plate of claim 10 wherein each of said plurality of longitudinal flow channels has a groove formed therein to locally increase a depth thereof.

16. The flow field plate of claim 1 further comprising at least one machining allowance tab formed on a perimeter of said thin plate.

17. The flow field plate of claim 1 further comprising a reference point formed in said flow field for receiving a datum pin.

18. The flow field plate of claim 17 wherein said reference point comprises a first reference flow channel provided in one of said serpentine legs and a second reference flow channel provided in at least one of said inlet legs and said outlet legs, said first reference flow channel being substantially perpendicular to said second reference flow channel.

19. The flow field plate of claim 1 further comprising a chamfered corner formed in said thin plate adjacent said flow field.

20. A flow field plate for use in a fuel cell of the type having a thin plate including an inlet margin having an inlet header formed therethrough, an exhaust margin having an exhaust header formed therethrough, and a first major face having a flow field formed therein, said flow field defined by a plurality of flow channels, each of said plurality of flow channels comprising:
   an inlet leg including a first longitudinal portion in fluid communication with said inlet header and a first transverse portion;
   a serpentine leg having a first end in fluid communication with said first transverse portion and a second end; and
   an exhaust leg having a second transverse portion in fluid communication with said second end of said serpentine leg and a second longitudinal portion in fluid communication with said first exhaust header.

21. The flow field plate of claim 20 wherein each of said serpentine legs comprise a first serpentine channel having an inlet in fluid communication with said first transverse portion of said inlet leg and a second serpentine channel having an inlet in fluid communication with an exhaust of said first serpentine channel and an exhaust in fluid communication with said second transverse portion of said exhaust leg.

22. The flow field plate of claim 20 further comprising a plurality of inlet manifolds formed in a second major face opposite said first major face and an inlet port formed through said inlet margin to provide fluid communication from said inlet header to said flow field.

23. The flow field plate of claim 22 further comprising a plurality of exhaust manifolds formed in said second major face and an exhaust port formed through said exhaust margin to provide fluid communication from said flow field to said exhaust header.

24. The flow field plate of claim 20 wherein said flow field further comprise a transition zone interposed between said inlet header and at least a portion of said inlet legs, said transition zone having an array of flow disruptors.

25. The flow field plate of claim 20 wherein said flow field further comprise a transition zone interposed between said at least a portion of said exhaust legs and said exhaust header, said transition zone having an array of flow disruptors.

26. The flow field plate of claim 20 further comprising a second flow field formed in a second major face opposite said first major face of said thin plate, said second flow field having a plurality of longitudinal flow channels formed therein, a plurality of transverse inlet legs providing fluid communication from a second inlet header formed in said inlet margin and said plurality of longitudinal flow channels, and a plurality of transverse exhaust legs providing fluid communication from said plurality of longitudinal flow channels to a second exhaust header formed in said exhaust margin.

27. The flow field plate of claim 26 further comprising a plurality of inlet manifolds formed in said second major face to provide fluid communication from said second inlet header to said second flow field.

28. The flow field plate of claim 26 further comprising a plurality of exhaust manifolds formed in said second major face to provide fluid communication from said second flow field to said second exhaust header.

29. The flow field plate of claim 26 wherein said second flow field further comprises an array of flow disruptors adjacent said second inlet header.

30. The flow field plate of claim 26 wherein said second flow field further comprises an array of flow disruptors adjacent said second exhaust header.

31. The flow field plate of claim 26 wherein each of said plurality of longitudinal flow channels has a groove formed therein to locally increase a depth thereof.

32. The flow field plate of claim 20 further comprising at least one machining allowance tab formed on a perimeter of said thin plate.

33. The flow field plate of claim 20 further comprising a reference point formed in said flow field for receiving a datum pin.

34. The flow field plate of claim 33 wherein said reference point comprises a first reference flow channel provided in one of said serpentine legs and a second reference flow channel provided in at least one of said inlet legs and said outlet legs, said first reference flow channel being substantially perpendicular to said second reference flow channel.

35. The flow field plate of claim 20 further comprising a chamfered corner formed in said thin plate adjacent said flow field.

* * * * *